Aug. 7, 1923.

L. A. CHARBONNEAU

OPTICAL TELEGRAPHY

Filed July 9, 1920

1,463,797

2 Sheets-Sheet 1

Aug. 7, 1923.

L. A. CHARBONNEAU

OPTICAL TELEGRAPHY

Filed July 9, 1920

1,463,797

2 Sheets-Sheet 2

Patented Aug. 7, 1923.

1,463,797

UNITED STATES PATENT OFFICE.

LEON ALBERT CHARBONNEAU, OF LACKEN, BRUSSELS, BELGIUM.

OPTICAL TELEGRAPHY.

Application filed July 9, 1920. Serial No. 395,033.

(GRANTED UNDER THE PROVISIONS OF THE ACT OF MARCH 3, 1921, 41 STAT. L., 1313.)

*To all whom it may concern:*

Be it known that I, LEON ALBERT CHARBONNEAU, a citizen of the French Republic, residing at Lacken, Brussels, Belgium, have invented certain new and useful Improvements in Optical Telegraphy, of which the following is a specification, for which improvement I have filed applications: France, No. 18,438, filed February 11th, 1918, Patent No. 504,320; Belgium, No. 225,989, filed September 1st, 1919; Netherlands, No. 13,902, filed January 27th, 1920; Switzerland, No. 3,386, filed December 27th, 1919; Spain, filed January 15th, 1920; a patent has been granted in Great Britain, No. 146,138.

This invention relates to optical telegraphy. It has for its chief object to render possible transmission of signals by optical telegraphy without the signals sent out by a transmitting station being capable of being perceived by receiving stations other than that for which they are intended.

The invention consists in providing apparatus for optical signaling comprising means for emitting invisible signals composed of infra-red rays, and means for receiving said signals and for rendering them legible owing to the property of infra-red rays of extinguishing the phosphorescence of certian phosphorescent substances.

A suitable substance is green sulphide of zinc.

In putting the invention into practice the transmitting apparatus is constructed to send out only infra-red rays at given time intervals and for periods of given length of time, in a manner similar to that utilised for the transmission of Morse signals by dots and dashes, and the receiving apparatus receives the rays thus sent out on a band impregnated with the phosphorescent substance and travelling in a continuous manner, whereby owing to the phosphorescence being extinguished at the points struck by the infra-red rays, the signals sent out will make a legible impression on the band.

The invention will be more clearly understood from the following description with reference to the accompanying drawings, given merely by way of example, of apparatus embodying the invention.

Figure 1:
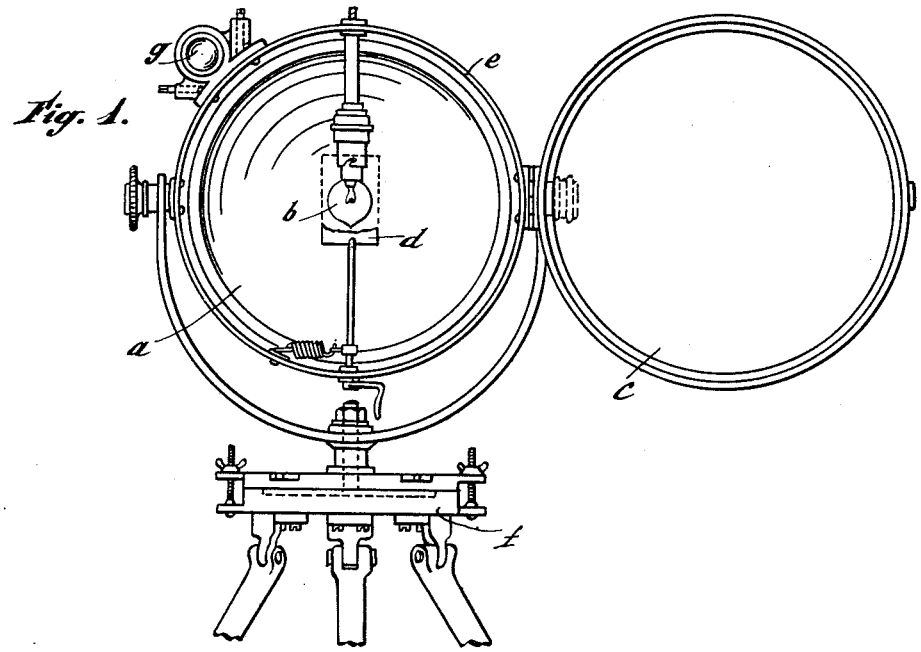
Figure 3:
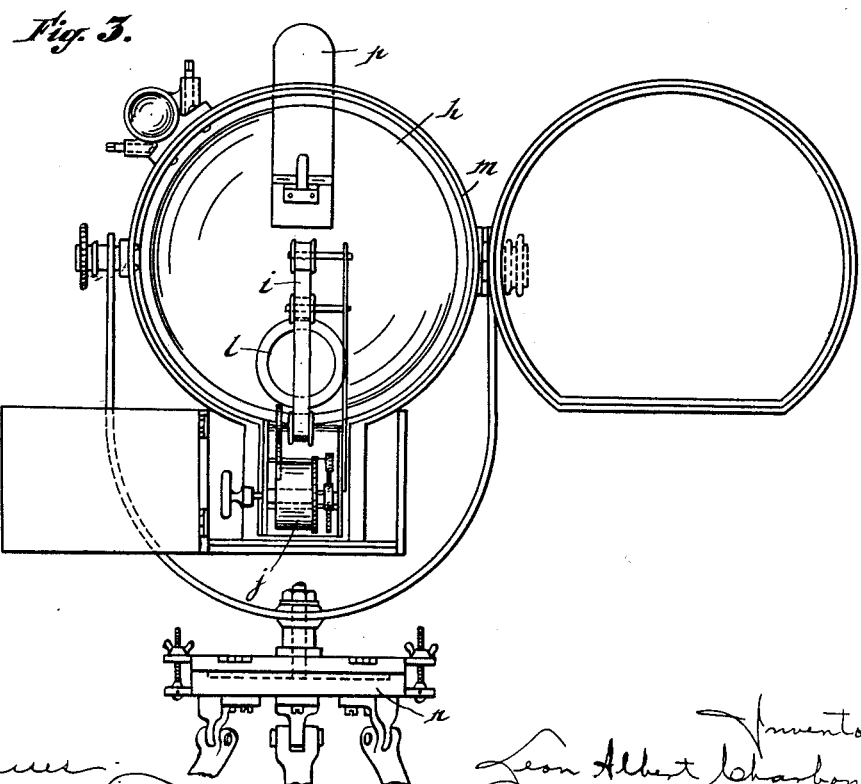
Figure 2:
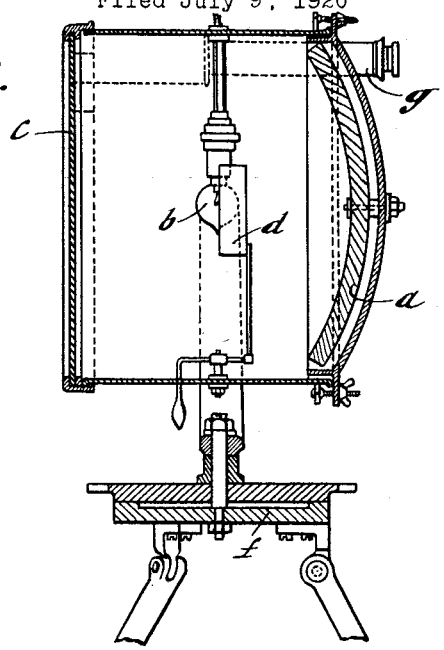
Figure 4:
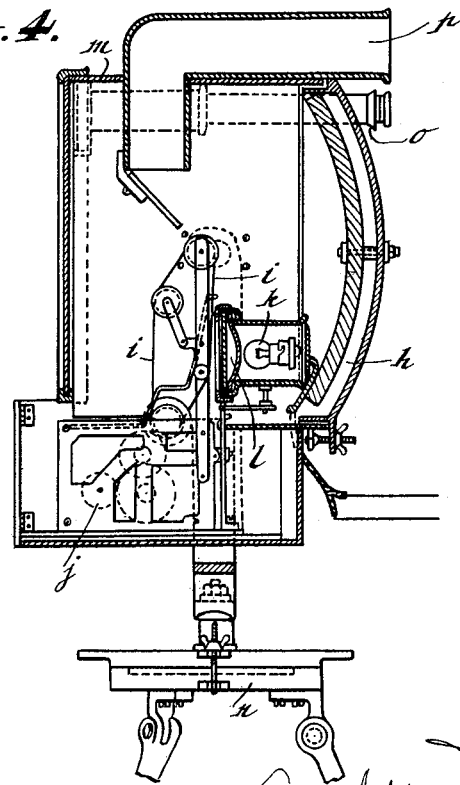

In these drawings,

Figures 1 and 2 show respectively in elevation and in section a transmitting apparatus, and Figures 3 and 4 show respectively in front elevation and in section, a receiving apparatus.

The transmitter apparatus comprises a concave mirror $a$, a source of light $b$ rich in infra-red rays, for instance an incandescent lamp which is placed in the focus of the said mirror, a screen $c$ capable of intercepting any but the infra-red rays, which screen is so arranged that it lies in the path of all the rays emitted, whether directly by the source $b$ or reflected from the mirror $a$, which is directed towards the receiving station, and means suitable for preventing whenever desired the rays emitted by the source of light, from striking the mirror $a$; which means are constituted for instance by an opaque shutter $d$ interposed between the source of light $b$ and the mirror $a$ and which can be moved by means such as a Bowden wire whenever it is desired to send out signals. The term Bowden wire as used herein has reference to a commercial device which is generally known by this name, and which consists of a hard steel wire in a tube which may be bent in almost any direction, the wire having at the end a rigid push rod, the object being to transmit a thrust through the wire on a curved or angular line, the wire being pushed through the tube for this purpose.

The apparatus preferably includes a cylindrical casing $e$ constituting, with the mirror $a$ and the screen $c$, a sort of lantern which is mounted by a Cardan joint to a support or bracket $f$, whereby the optical axis of the said apparatus can be directed in any direction, and a telescope $g$ secured to the said casing making it possible to sight the receiving station to which it is desired to send signals, and to bring the optical axis of the apparatus into the desired position for this purpose. The term Cardan joint specifies an universal joint.

The screen $c$ may be any screen having the properties required, for instance, black glass of the following approximate composition could be used: silica 66.80, alumina 0.45, manganese oxide (MnO) 5.90, lime 9.25, magnesia 0.15, caustic soda 16.85, sesquioxide of iron 0.40.

The receiving apparatus comprises either a lens or a concave mirror $h$ intended to receive the parallel beam of infra-red rays sent out by the transmitting station, and to concentrate them at its focus; an endless band $i$ covered with a phosphorescent substance and mounted in such a manner on guide rollers that one of the parts of the said band passes through the focus of the said lens or mirror $h$; a clockwork train $j$ adapted to ensure continuous movement at constant speed of the said band $i$; and a source of rays for rendering phosphorescent the substance such as green sulphide of zinc which covers the said band, which source is preferably constituted by a lamp $k$ enclosed in a light-tight box fitted with a special screen $l$ constituted by a blue monochromatic glass or still better by a transparent chamber containing a solution of ammonia copper sulphate. The rays emitted by the said source, on passing through the said screen, strike the surface of the band $i$ at a point other than the focus of the lens or mirror $h$. Preferably the receiving apparatus has a casing $m$ closed in front by a black glass adapted to allow reception to take place in day time—intended to connect together the various elements of the said receiver. The casing is mounted by means of a Cardan joint on a support $n$ and provided with a sighting telescope $o$, and with an eye piece $p$ through which can be read on the band $i$, level with the focus of the lens or mirror, the impressions produced by the infra-red rays.

The signalling is effected by bringing into coincidence by sighting the optical axes of the two stations, lighting the lamps $b$ and $k$, starting the clock-work $j$ in order that every emission, whether long or short, of infra-red rays, produced by the working of the shutter $d$, is received by the lens or mirror $h$ of the receiving station and concentrated at its focus on the band $i$ producing on the said band, by the extinction of the phosphorescence as described dashes or dots which can be read through the eye-piece $p$ like ordinary Morse signals.

The phosphorescence of the substance is then re-established by its passage in front of the screen $l$.

A recording apparatus can be obtained by arranging between the focus of the receiving apparatus and the screen $l$ a device adapted to apply against the band $i$ another band impregnated with a sensitive substance, such as a photographic film or paper, so as to be printed upon by the signals emitted.

The invention is not limited to the particular apparatus described, but comprises modifications.

What I claim as my invention and desire to secure by Letters Patent is:—

1. A signalling apparatus consisting of means for emitting and directing signals composed of infra-red rays and means for receiving said signals consisting of a phosphorescent substance the luminosity of which is extinguished by the action of the infra-red rays.

2. A signalling apparatus consisting of means for emitting and directing signals composed of infra-red rays and means for receiving said signals consisting of a phosphorescent substance the luminosity of which is extinguished by the action of the infra-red rays, same consisting of green sulphide of zinc.

3. A signalling apparatus including means for emitting invisible rays, means for focusing same and receiving apparatus including a movable member and a phosphorescent substance thereon the luminosity of which is extinguished by the action of the invisible rays and a source of rays for rendering the said substance phosphorescent.

4. A receiving apparatus for optical signaling consisting of focusing means; a band coated with a phosphorescent substance; means for moving the same through the focus of the said focusing means and a source of rays for rendering the said substance phosphorescent.

5. A signalling apparatus consisting of a source of invisible rays; means for directing and focusing same; a member in the focus of said means; a phosphorescent coating thereon; means in the form of a second source of rays for rendering the said substance phosphorescent and a recording apparatus consisting of a sensitive member in the nature of a photographic sheet to be printed by the luminous signals thus emitted.

In testimony whereof I have signed my name to this specification in the presence of two subscribing witnesses.

LEON ALBERT CHARBONNEAU.

Witnesses:
 FELIX DE COSMAN,
 JOSEPH VUTERS.